United States Patent Office 3,350,443
Patented Oct. 31, 1967

3,350,443
PROCESS FOR PRODUCING PYROMELLITIC
ACID AND MELLOPHANIC ACID
Jürgen Schlegel, 14 Main St., Hagen, Germany, and
Georg Kolling, Kieferhalde 26, Essen, Germany
No Drawing. Filed Aug. 7, 1963, Ser. No. 300,689
Claims priority, application Germany, Aug. 9, 1962,
B 68,359
11 Claims. (Cl. 260—523)

The invention relates to processes for producing pyromellitic acid and mellophanic acid.

It is a general object of the invention to provide improved processes of the above-noted type.

More specifically, it is an object of the invention to provide improved processes for producing pyromellitic and mellophanic acids, which processes are surprisingly simple compared with known processes.

Further, it is an object of the invention to provide improved processes which are neither protracted nor laborious.

Processes of the invention are, relative to prior processes, extremely simple and may comprise the oxidizing of octahydro anthracene or octahydro phenanthrene with a stoichiometric excess of nitric acid at a temperature of 130°–220° C.

The octahydro compounds required in the above process can readily be respectively prepared from anthracene or phenanthrene, which are inexpensive materials and need not be pure, by partially hydrogenating them at temperatures of 200°–450° C. and at pressures of 150–300 atm., in the presence of from 0.1 to 1% by weight of the anthracene or phenanthrene of a catalyst selected from the oxides and sulphides of cobalt, molybdenum, tungsten and copper.

In the nitric acid oxidation, it is preferable to use nitric acid of a specific gravity of 1.20–1.40, in an amount relative to the octahydro compound of 5 to 50, and preferably 10 to 20 times the same at a temperature of 130°–170° C. The reaction time for the oxidation is generally 1–8 hours, and usually 2–5 hours.

One method of carrying out the oxidation is to heat the reactants in an autoclave, wherein pressures of about 2–30 atm. are produced due to the formation of oxides of nitrogen. Higher pressures may be used, but it is advisable for the safety of the apparatus to allow the gases to escape through a relief valve when the pressure is in the region of 50 to 100 atm.

An alternative method is to carry out the oxidation at normal pressure, in solution. The octahydro compound is, in this instance, dissolved in a neutral, high-boiling solvent which is inert to nitric acid, such as nitrobenzene or dibromobenzene, in a concentration by weight of 5–50%, preferably 5–25%; the solution is preheated, and comparatively concentrated nitric acid, of a specific gravity of 1.3–1.4, is then added. The reaction can be assisted by the addition of a catalyst, such as nitrate, acetate or other salt of copper, manganese, cobalt or vanadium in an amount of 0.1–1% by weight of the octahydro compound.

Since pressure is not used in this latter method, the linings of the apparatus can be made of glass, which is not pressure-resistant but is resistant to corrosion by nitric acid, and this solution to the corrosion problem is of considerable value. The use of pressure, e.g. of 2–30 atm., as described in the first method does, however, accelerate the reaction.

The benzene tetracarboxylic acid produced by either method is formed in good yield and high purity and is recovered by cooling the reaction mixture. It is remarkable that nitrocarboxylic acids and quinones are not formed as a result of dehydration preceding the oxidation.

The following non-limitating examples are given to illustrate the invention.

*Example 1.—Production of pyromellitic acid, under pressure*

Octahydro anthracene was first prepared as follows: 100 parts by weight of crude anthracene were treated with hydrogen in a pressure vessel in the presence of 1 part by weight of a molybdenum sulphide catalyst, at 350° C. and a pressure of 150 atm., until the theoretical amount of hydrogen for the formation of octahydro anthracene had been taken up. 105 parts by weight were obtained of octahydro anthracene, corresponding to a yield of 99%. The melting point of the crude, faintly yellowish product, lay between 65°–75° C.

10 parts by weight of the octahydro anthracene were then heated in a pressure vessel with 150 parts by weight of nitric acid (s.g. 1.30) at 160° C.; the pressure rose to 20 atm. After 4 hours the reaction was completed, and the mixture was cooled to 0° C. 12 parts by weight were obtained of pyromellitic acid, corresponding to 85.5% of the theoretical yield, having an acid number of 875 (theoretically 883). The acid could be further purified by recrystallization from dilute mineral acid.

*Example 2.—Production of pyromellitic acid, in solution*

A solution was made of 20 parts by weight of the octahydro anthracene obtained according to Example 1 in 100 parts by weight of nitrobenzene. The solution was placed in a stirrer vessel equipped with a heatable supply and reflux condenser with water separator, and heated to 140–150° C. Then 300 parts by weight of nitric acid of s.g. 1.40 which was preheated to 100° C. were dropped into the hot solution over a period of 5 hours with intensive agitation, so that the temperature was maintained at 140–150° C. over the entire reaction. The reaction mixture was cooled and the precipitated pyromellitic acid was filtered off and was steam-distilled to remove the attached nitrobenzene. The residue from the distillation was re-crystallized from nitric acid, and 20 parts by weight of pyromellitic acid were obtained, corresponding to 73% of the theoretical.

*Example 3.—Production of mellophanic acid, under pressure*

Octahydro phenanthrene was prepared by treating 100 parts by weight of technical phenanthrene in a pressure vessel in the presence of 1 part by weight of a catalytic mixture of cobalt oxide and molybdenum oxide at 450° C. and 250 atm. pressure, until the amount of hydrogen corresponding to the formation of octahydro phenanthrene had been taken up. 103 parts by weight of crude octahydro phenanthrene were obtained in the form of a bright yellow liquid; the yield was 98%.

10 parts by weight of the octahydro phenanthrene were then reacted in a pressure vessel with 120 parts by weight of nitric acid of s.g. 1.40 at 150° C. for 3 hours. The reaction mixture was cooled to 0° C. and there were obtained 11 parts by weight of mellophanic acid, =79% of the theoretical calculated on the phenanthrene used, of an acid number 877 (theoretical 883). The acid could be further purified by recrystallization from dilute mineral acid.

*Example 4.—Production of mellophanic acid, in solution*

A solution of 20 parts by weight of the octahydro phenanthrene obtained according to Example 3 in 50 parts by weight of dibromobenzene was heated in the apparatus of Example 2 at 160°–165° C. Over a period of 5 hours 300 parts by weight of nitric acid of s.g. 1.35, preheated to 100° C., were added with intensive agitation, while the temperature was maintained at 160°–165° C. The reaction mixture was then cooled to about 100° C. and extracted with hot water and the aqueous solution then evaporated until crystallization occurred at the boiling point. The solution was cooled to 0° C. and 21 parts by weight of mellophanic acid were obtained corresponding to 77% of the theoretical.

What is claimed is:
1. A process comprising oxidizing a hydrogenated fused ring aromatic compound selected from the group consisting of octahydro anthracene and octahydro phenanthrene with nitric acid in a liquid state at a specific gravity of between 1.2 and 1.4 at a temperature of from 130–170° C. to form an acid selected from the group consisting of pyromellitic and mellophanic acids, the octahydro anthracene and octahydro phenanthrene being produced by hydrogenating anthracene and phenanthrene respectively at a temperature of from 200–450° C.
2. A process as claimed in claim 1 comprising effecting the oxidizing in solution in a neutral high-boiling solvent which is inert to nitric acid.
3. A process as claimed in claim 2 wherein the solvent is selected from the group consisting of nitrobenzene and dibromobenzene.
4. A process as claimed in claim 2 wherein the hydrogenated aromatic compound constitutes 5–50% by weight of the solution.
5. A process as claimed in claim 2 wherein the hydrogenated aromatic compound constitutes 15–25% by weight of the solution.
6. A process as claimed in claim 1 wherein the oxidizing is effected in the presence of a catalyst selected from the group consisting of salts of copper, manganese, cobalt and vanadium and in an amount of .1–1% of the hydrogenated aromatic compound.
7. A process as claimed in claim 1 wherein the oxidizing is effected in a closed vessel under autogenously developed pressure.
8. A process as claimed in claim 1 wherein the hydrogenating is effected at a pressure of from 150–300 atmospheres.
9. A process as claimed in claim 8 wherein the hydrogenating is effected in the presence of .1–1% by weight of the aromatic compound of a catalyst selected from the group consisting of cobalt, molybdenum, tungsten and copper oxides and sulphides.
10. A process as claimed in claim 1 wherein the reaction time is 1–8 hours.
11. A process as claimed in claim 1 wherein the reaction time is 2–5 hours.

References Cited

UNITED STATES PATENTS

| 1,960,977 | 5/1934 | Pier et al. | 260—523 |
| 2,176,348 | 10/1939 | Juettner | 260—523 |
| 2,726,262 | 12/1955 | Grosskinsky et al. | 260—523 |
| 2,839,575 | 6/1958 | Fetterly | 260—524 |

FOREIGN PATENTS

| 547,300 | 10/1957 | Canada. |
| 766,564 | 1/1957 | Great Britain. |
| 782,817 | 9/1957 | Great Britain. |

OTHER REFERENCES

Chemical Abstracts (C.A.), vol. 11, part 2 (1917), pp. 1648–49.

Desha: "Organic Chemistry" (1952), 2nd edition (McGraw-Hill), pp. 109–113.

Elsevier: "Encyclopedia of Organic Chemistry" (1948), vol. 13, pp. 209, 795.

Elsevier: "Encyclopedia of Organic Chemistry" (1948), vol. 12$^B$, pp. 65–66.

Karrer: "Organic Chemistry" (1950), p. 532.

LORRAINE A. WEINBERGER, *Primary Examiner.*

S. B. WILLIAMS, *Assistant Examiner.*